United States Patent [19]

Oishi et al.

[11] Patent Number: 4,538,412
[45] Date of Patent: Sep. 3, 1985

[54] EXHAUST GAS CLEANING DEVICE FOR DIESEL ENGINES

[75] Inventors: Kiyohiko Oishi, Susono; Yasuhiko Ishida, Mishima; Kenichirou Takama, Susono, all of Japan

[73] Assignee: Toyota Jidosha Kabushiki Kaishi, Japan

[21] Appl. No.: 484,958

[22] Filed: Apr. 14, 1983

[30] Foreign Application Priority Data

Aug. 6, 1982 [JP] Japan ................................ 57-136388

[51] Int. Cl.³ .............................................. F01N 3/02
[52] U.S. Cl. ........................................ 60/288; 55/212; 55/DIG. 30; 60/303; 60/311
[58] Field of Search ........................ 60/311, 303, 288; 55/212, DIG. 30

[56] References Cited

U.S. PATENT DOCUMENTS

| 4,335,574 | 6/1982 | Sato | 60/311 |
| 4,404,796 | 9/1983 | Wade | 60/303 |
| 4,427,418 | 1/1984 | Kogiso | 60/303 |

FOREIGN PATENT DOCUMENTS 1216496 11/1959 France ................................ 60/288

*Primary Examiner*—Douglas Hart
*Attorney, Agent, or Firm*—Parkhurst & Oliff

[57] ABSTRACT

An exhaust particulate cleaning device for a diesel engine comprising a trap case which is located in a passageway of the exhaust gas and which has therein a filter material for trapping the exhaust particulates contained in the exhaust gas, an electric heater for igniting and burning the exhaust particulates trapped in the filter material, a larger bypass passage of the exhaust gas bypassing the trap case, and a control valve in the bypass passage for opening and closing the bypass passage.

5 Claims, 1 Drawing Figure

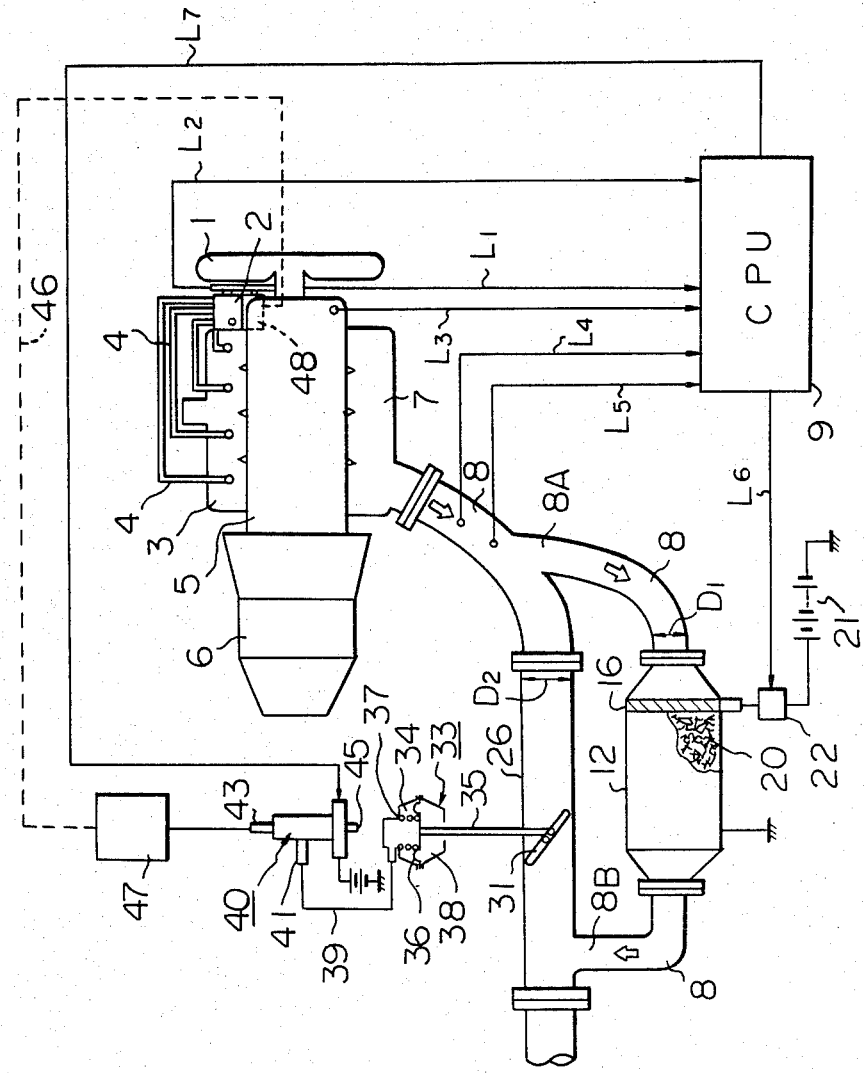

EXHAUST GAS CLEANING DEVICE FOR DIESEL ENGINES

BACKGROUND OF THE INVENTION

1. Field of the Invention

This invention generally relates to an exhaust gas cleaning device for diesel engines of motor vehicles. More particularly this invention relates to a device having a filter capable of physically trapping carbon particulates or the like (hereinafter referred to as exhaust particulates) contained in the exhaust gas and means for burning and removing periodically the caught exhaust particulates, thereby regenerating the capability of the filter.

2. Description of the Prior Art

Exhaust emissions of diesel engines contain considerable amounts of combustible substances, such as carbon particulates, as well as other harmful substances. Hitherto, various kinds of trapping devices have been proposed and used for treating such combustible particulates.

Such trapping devices usually include filter elements, i.e., trapping materials for trapping or catching the exhaust particulates, and means for igniting and burning the trapped exhaust particulates to regenerate the filter elements. As means for igniting and burning the trapped exhaust particulates, an electric heater provided in front of the filter elements is usually used. The heater ignites the trapped exhaust particulates at the upstream end of the filter elements adjacent to the heater. The combustion of the exhaust particulates is then propagated to the trapped articles at the portions of the filter elements downstream from the ignited particulates so that self-combustion of the particulates downstream from the ignited particulates takes place.

If the exhaust gas flows through the filter elements at a high velocity when the heater is electrically energized, the heat of the heater is absorbed by the exhaust gas and the particulates cannot be heated to a temperature high enough for ignition. Even if the particulates are ignited, the high-velocity exhaust gas flow absorbs the heat of the ignited particulates, i.e., of the combustion being propagated, resulting in the failure of complete propagation of the combustion to the particulates located at the downstream end of the filter element. This limits the range of driving conditions of the engine and the periods in which the regeneration of the filter elements can occur.

SUMMARY OF THE INVENTION

The object of the present invention is to solve the above-mentioned problem by providing a cleaning device for exhaust particulates of a diesel engine in which the regeneration of the cleaning device can be easily effected in a large range of engine driving conditions.

According to an aspect of the present invention, there is provided a cleaning device for exhaust particulates of a diesel engine. The cleaning device contains a trap case provided in a main passageway of the exhaust gas, a filter material disposed in the trap case so that carbon particulates or other exhaust particulates contained in the exhaust gas can be caught in the filter material during the time the exhaust gas passes through the filter material and an electric heater for igniting and burning the exhaust particulates in the filter material. The device additionally contains a bypass passage, which extends between the upstream and downstream portions of the main passageway from the trap case so as to bypass the trap case. The bypass passage has a larger inner diameter than that of the main passageway, and a control valve means in the bypass passage for selectively opening and closing.

With this arrangement, the amount of the exhaust gas flowing through the main exhaust gas passageway can be easily controlled by the control valve means and, accordingly, regeneration of the cleaning device can be effected even under an engine driving condition in which a large amount of exhaust gas is discharged from the engine.

BRIEF DESCRIPTION OF THE DRAWING

The invention will be discussed below in detail with reference to FIG. 1 which is a schematic illustration of a diesel engine provided with a cleaning device for exhaust particulates of the present invention.

DETAILED DESCRIPTION OF THE PREFERRED EMBODIMENTS

FIG. 1 shows a schematic drawing of a diesel engine with the cleaning device of the present invention, a cooling fan 1 of a diesel engine, a fuel injection pump 2, an intake manifold 3, fuel pipes 4, a main body of the diesel engine 5, a transmission 6, an exhaust manifold 7, a main exhaust gas pipe 8 and a microcomputer (central processing unit: CPU) 9.

$L_1$, $L_2$, $L_3$, $L_4$ and $L_5$ designate a detection signal line for engine revolution, a detection signal line for engine load, a detection signal line for engine coolant temperature, a detection signal line for exhaust gas pressure; and a detection signal line for exhaust gas temperature, respectively. These detection signal lines $L_1$, $L_2$, $L_3$, $L_4$ and $L_5$ are connected to conventionally known sensors for detecting the engine speed, engine load, engine coolant temperature, exhaust gas pressure, and exhaust gas temperature, respectively, and each detected value is input to the CPU 9.

A trap case 12 is located in the main exhaust gas pipe 8 downstream of the exhaust manifold 7.

The trap case 12 may be judiciously located near a collecting portion of the exhaust manifold 7, so that the trap case 12 can be molded integrally with the exhaust manifold 7 by, for example, die casting. The trap case 12 is provided with a filter material 20 therein. Any suitable ceramic foam known in the art or other similar ceramic materials can be used as the filter material 20. Any filter material 20 can be used if the material is three-dimensional mesh structure through which exhaust gas can be freely passed and the exhaust particulates contained in the exhaust gas can be trapped or caught in the mesh structure. An electric heater 16 is provided at the upstream end of the filter material 20. The heater 16 can be of any type, for example, a heater having a coil winding heater wire or plane zigzag heater wires or a known ceramic heater having one or more electric heater elements secured to a honeycomb ceramic insulation layer.

One example of the ceramic heater which can be used in the present invention is described in the copending U.S. application Ser. No. 347,424 filed Feb. 10, 1982, of the same assignee as that of the present application.

The heater 16 is electrically connected, at its positive terminal, to a battery 21 via a relay 22 for controlling the electrical connection between the battery 21 and the heater 16. The negative terminal of the heater 16 is connected to the trap case 12 which is, grounded.

When electric power is supplied to the heater 16 from the battery 21, the exhaust particulates trapped by the filter material 20 at the upstream end of the filter material adjacent to the heater 16 is first ignited and burnt. After that, the combustion flame is propagated toward the downstream end of the filter material 20 with the help of the exhaust gas flowing therethrough, thus resulting in completion of combustion of the exhaust particulates over the entirety of the filter material 20. Thus, the regeneration of the filter material 20 is completed.

The time for starting the regeneration, i.e., for making the heater ON, is controlled by the CPU 9 in accordance with various signals or information fed from the lines $L_1$, $L_2$, $L_3$, $L_4$ and $L_5$. The control signal for making the heater ON is fed to the relay 22 from CPU 9 by means of a signal line $L_6$. When the relay 22 is made ON, the heater 16 is energized by the battery 21, and vice versa.

A detection signal of the temperature on the inside of the trap case and/or a detection signal of exhaust gas temperature downstream of the trap case may be also input to the CPU 9 as a parameter for controlling the time of regeneration of the filter material 20. The control of the time of regeneration is described in detail, for example, in the above-mentioned U.S. patent application Ser. No. 347,424.

The above-mentioned construction itself is known and is a typical exhaust gas cleaning device for diesel engines.

According to the present invention, there is provided a bypass passage 26, which extends between upstream and downstream portions of the exhaust gas pipe 8 from the trap case 12. In the bypass passage 26 is arranged a control valve 31 which can be in an inoperative position (closed position) to close the bypass passage and in an operative position (open position) to open the bypass passage. The control valve 31 is in a full open position, for example when an accelerating pedal of an associated automobile is fully depressed. The control valve 31 is actuated by an actuator 33 which is, for example, in the form of a diaphragm device. The actuator 33 has a diaphragm 36 which defines an atmospheric chamber 38 and a vacuum chamber 34 separated from the atmospheric chamber 38. The control valve 31 is connected to the diaphragm 36 by means of an operative rod 35. The vacuum chamber 34 is connected to a vacuum switching valve (VSV) 40 which can be, for example, a solenoid type, by means of a pressure sensing pipe 39. When vacuum is introduced in the vacuum chamber 34, the diaphragm 36 is moved upward in FIG. 1 against a return spring 37 arranged in the vacuum chamber 34, so that the valve 31 is opened to allow the exhaust gas to flow through the bypass passage 26. The VSV 40 has three ports 41, 43, and 45, of which the first port 41 is connected to the vacuum chamber 34, the second port 43 to a vacuum source, such as a vacuum pump 48, through a vacuum tank 47 by means of a pressure line 46 and the third port 45 to the atmosphere. The VSV 40 operates in response to a switching signal fed by a signal line $L_7$ from the CPU 9 to selectively occupy a first position (normal position) in which the pressure connection is established between the first and third ports 41 and 45 and a second position in which the pressure connection is established between the first and second ports 41 and 43.

To enable a large part of the exhaust gas to flow through the bypass passage 26 rather than through the trap case side when the control valve 31 opens, the bypass passage 26 has an inner diameter $D_2$ (e.g., $D_2 = 50$ mm) which is larger than an inner diameter $D_1$ (e.g., $D_1 = 30$ mm) of the main exhaust gas pipe 8, according to the invention. Further, it is not the main exhaust gas pipe 8 having the trap case 12 but the bypass passage 26 that extends along a smooth line of the passageway of the exhaust gas. In other words, the main exhaust pipe 8 largely changes in angle at a bifurcated portion 8A and a collecting portion 8B of the pipe 8 in comparison with the bypass passage 26. With this arrangement, a large part of the exhaust gas designated by arrows can flow through the bypass passage 26 when the control valve 31 opens. When the control valve 31 is in a closed position all of the exhaust gas flows through the trap case 12, so that the exhaust particulates can be effectively trapped by the filter material 20.

When the VSV 40 is turned ON to an ON position by the switching signal on the signal line $L_7$, which is signalled at the commencement of the ignition of the exhaust particulates, i.e., at the commencement of the supply of the electric power to the heater 16. This is done because if a large amount of exhaust gas, i.e., the exhaust gas flowing at high speed, flows through the trap case 12, failure of ignition of the exhaust particulates tends to take place, as mentioned before. In order to prevent this, the control valve 31 opens at the commencement of the regeneration of the filter material 20, so that little exhaust gas flows through the trap case 12. The control valve 31 is closed again immediately after the completion of the ignition, so that the exhaust gas flows through the trap case 12. The flow of the exhaust gas causes the propagation of the combustion of the exhaust particulates at the upstream end of the filter material 20 toward the exhaust particulates at the downstream end thereof. Namely, the diaphragm device 33 causes the control valve 31 to open only when the ignition of the exhaust particulates at the upstream end of the filter material 20 occurs, in accordance with the switching signal fed to the VSV 40 from the CPU 9.

Even under an engine driving condition in which a large amount of the exhaust gas is discharged from the engine, the regeneration of the filter material of the trap case can be effected.

We claim:
1. An exhaust particulate cleaning device for a diesel engine comprising:
 a main passageway for exhaust gas having uniformly sized upstream and downstream portions and a middle portion between and narrower than the upstream and downstream portions;
 a trap case provided in the middle portion of the main passageway;
 a filter material disposed in the trap case for catching within the filter material particulates contained in the exhaust gas when the exhaust gas passes through the filter material;
 a heater means disposed at an upstream end of the filter material for igniting and burning the exhaust particulates trapped in the filter material;
 a bypass passage for the exhaust gas which bypasses the trap case and extends between the upstream and downstream portions of the main passageway, the bypass passage having an inner diameter the same size as the upstream and downstream portions of the main passageway and extending along a line of smooth flow of the exhaust gas discharged from the engine;

a control valve means in the bypass passage for opening and closing the bypass passage;

a signal means for generating a signal indicating commencement of ignition of the exhaust particulates in the filter material;

a control means responsive to the signal to open the control valve means for a predetermined short period following receipt of the signal to allow a substantial amount of the exhaust gas to pass through the bypass passage during burning of said exhaust particulates, and for closing the control valve at the end of the short period to allow said exhaust gas to pass through the filter material.

2. A device according to claim 1, wherein said actuating means comprises a diaphragm device having a diaphragm which defines a vacuum chamber and which has an operative rod connected to the control valve means.

3. A device according to claim 2, further comprising a vacuum switching valve means for selectively introducing vacuum into the vacuum chamber of the diaphragm device.

4. A device according to claim 3, wherein said vacuum switching valve means operates to introduce vacuum into the vacuum chamber of the diaphragm device only at the commencement of the ignition of the exhaust particulates by the heater means.

5. The device according to claim 1, wherein said heater means is an electric heater.

* * * * *